United States Patent
Bjergaard et al.

(10) Patent No.: US 11,698,562 B2
(45) Date of Patent: Jul. 11, 2023

(54) PRIVACY GLAZING SYSTEM WITH DISCRETE ELECTRICAL DRIVER

(71) Applicant: Cardinal IG Company, Eden Prairie, MN (US)

(72) Inventors: Eric Bjergaard, Minneapolis, MN (US); Andrew DeMiglio, Savage, MN (US); Chad Peters, Prior Lake, MN (US)

(73) Assignee: Cardinal IG Company, Eden Prairie, MN (US)

(*) Notice: Subject to any disclaimer, the term of this patent is extended or adjusted under 35 U.S.C. 154(b) by 0 days.

(21) Appl. No.: 17/746,017

(22) Filed: May 17, 2022

(65) Prior Publication Data

US 2022/0276515 A1 Sep. 1, 2022

Related U.S. Application Data

(62) Division of application No. 16/182,433, filed on Nov. 6, 2018, now Pat. No. 11,360,364.
(Continued)

(51) Int. Cl.
*G02F 1/137* (2006.01)
*G02F 1/153* (2006.01)
(Continued)

(52) U.S. Cl.
CPC ............ *G02F 1/137* (2013.01); *B32B 17/00* (2013.01); *E06B 3/6722* (2013.01); *E06B 9/24* (2013.01);
(Continued)

(58) Field of Classification Search
CPC .. G02F 1/13394; G02F 1/153; G02F 1/13439; G02F 1/1339; G02F 1/13306;
(Continued)

(56) References Cited

U.S. PATENT DOCUMENTS

| | | |
|---|---|---|
| 3,951,846 A | 4/1976 | Gavrilovic |
| 3,953,630 A | 4/1976 | Roberts et al. |

(Continued)

FOREIGN PATENT DOCUMENTS

| | | |
|---|---|---|
| CN | 201226062 Y | 4/2009 |
| CN | 101775953 A | 7/2010 |

(Continued)

OTHER PUBLICATIONS

Bortolozzo et al., Abstract of "Transmissive Liquid Crystal Light-valve for Near-Infrared Applications," Appl. Opt., 52(22), Aug. 2013, accessed on the internet at https://www.osapublishing.org/ao/abstract.cfm?uri=ao-52-22- E73, retrieved Sep. 26, 2019, 2 pages.

(Continued)

*Primary Examiner* — Hoan C Nguyen
(74) *Attorney, Agent, or Firm* — Fredrikson & Byron, P.A.

(57) ABSTRACT

A controllable privacy structure, such as a window or door, may include an electrically controllable optically active material connected to a driver. The driver can control the application and/or removal of electrical energy to the optically active material to transition from a scattering state in which visibility through the structure is inhibited to a transparent state in which visibility through the structure is comparatively clear. The driver may need to be located in relatively close physical proximity to the privacy structure the driver is intended to control. Devices, systems, and techniques are described for discretely positioning a driver relative to a privacy structure to be controlled.

20 Claims, 10 Drawing Sheets

Related U.S. Application Data

(60) Provisional application No. 62/582,113, filed on Nov. 6, 2017.

(51) Int. Cl.

| | | |
|---|---|---|
| *G02F 1/163* | (2006.01) | |
| *B32B 17/00* | (2006.01) | |
| *E06B 3/67* | (2006.01) | |
| *E06B 9/24* | (2006.01) | |
| *G02F 1/133* | (2006.01) | |
| *G02F 1/1339* | (2006.01) | |
| *G02F 1/1343* | (2006.01) | |
| *G02F 1/1333* | (2006.01) | |
| *C03C 17/23* | (2006.01) | |

(52) U.S. Cl.
CPC ........ *G02F 1/1339* (2013.01); *G02F 1/13306* (2013.01); *G02F 1/13394* (2013.01); *G02F 1/13439* (2013.01); *G02F 1/153* (2013.01); *G02F 1/163* (2013.01); *B32B 2255/20* (2013.01); *B32B 2419/00* (2013.01); *C03C 17/23* (2013.01); *C03C 2217/215* (2013.01); *C03C 2217/216* (2013.01); *C03C 2217/24* (2013.01); *C03C 2217/94* (2013.01); *E06B 2009/247* (2013.01); *E06B 2009/2417* (2013.01); *E06B 2009/2464* (2013.01); *G02F 1/13398* (2021.01); *G02F 1/133302* (2021.01); *G02F 1/133317* (2021.01); *G02F 1/133328* (2021.01)

(58) Field of Classification Search
CPC .... G02F 1/137; G02F 1/163; G02F 1/133328; G02F 1/133317; G02F 1/133302; G02F 1/13398; E06B 9/24; E06B 3/6722; E06B 2009/247; E06B 2009/2417; E06B 2009/2464; B32B 17/00; B32B 2419/00; B32B 2255/20; C03C 2217/94; C03C 2217/216; C03C 2217/24; C03C 17/23; C03C 2217/215
See application file for complete search history.

(56) References Cited

U.S. PATENT DOCUMENTS

| | | | |
|---|---|---|---|
| 4,047,351 A | 9/1977 | Derner et al. | |
| 4,150,877 A | 4/1979 | Kobale et al. | |
| 4,277,294 A | 7/1981 | Orcutt | |
| 4,284,677 A | 8/1981 | Herliczek | |
| 4,465,340 A | 8/1984 | Suganuma | |
| 4,587,784 A | 5/1986 | Chavy et al. | |
| 4,614,676 A | 9/1986 | Rehfeld | |
| 4,702,566 A | 10/1987 | Tukude | |
| 4,749,261 A | 6/1988 | McLaughlin et al. | |
| 4,932,608 A | 6/1990 | Heidish et al. | |
| 4,958,917 A | 9/1990 | Hashimoto et al. | |
| 5,076,673 A | 12/1991 | Lynam et al. | |
| 5,103,336 A | 4/1992 | Sieloff | |
| 5,111,329 A | 5/1992 | Gajewski et al. | |
| 5,111,629 A * | 5/1992 | Baughman ............ G02F 1/1347 52/171.3 | |
| 5,142,644 A | 8/1992 | Vansteenkiste et al. | |
| 5,151,824 A | 9/1992 | O'Farrell | |
| 5,154,953 A | 10/1992 | De Moncuit et al. | |
| 5,164,853 A | 11/1992 | Shimazaki | |
| 5,168,387 A | 12/1992 | Asakura et al. | |
| 5,197,242 A | 3/1993 | Baughman et al. | |
| 5,202,787 A | 4/1993 | Byker et al. | |
| 5,239,406 A | 8/1993 | Lynam | |
| 5,244,557 A | 9/1993 | Defendini et al. | |
| 5,408,353 A | 4/1995 | Nichols et al. | |
| 5,589,958 A | 12/1996 | Lieb | |
| 5,643,644 A | 7/1997 | Demars | |
| 5,668,663 A | 9/1997 | Varaprasad et al. | |
| 5,766,755 A | 6/1998 | Chaussade et al. | |
| 5,796,452 A | 8/1998 | Pierson | |
| 5,855,638 A | 1/1999 | Demars | |
| 5,889,608 A | 3/1999 | Buffat et al. | |
| 6,001,487 A * | 12/1999 | Ladang ............ B32B 17/10174 428/432 | |
| 6,055,088 A | 4/2000 | Fix et al. | |
| 6,061,105 A | 5/2000 | Nakagawa | |
| 6,064,509 A | 5/2000 | Tonar et al. | |
| 6,143,209 A | 11/2000 | Lynam | |
| 6,261,652 B1 | 7/2001 | Poix et al. | |
| 6,280,041 B1 | 8/2001 | Unger et al. | |
| 6,297,900 B1 | 10/2001 | Tulloch et al. | |
| 6,317,248 B1 | 11/2001 | Agrawal et al. | |
| 6,340,963 B1 | 1/2002 | Anno et al. | |
| 6,366,391 B1 | 4/2002 | Hurtz | |
| 6,373,618 B1 | 4/2002 | Agrawal et al. | |
| 6,407,847 B1 | 6/2002 | Poll et al. | |
| 6,466,298 B1 | 10/2002 | Fix et al. | |
| 6,486,928 B1 | 11/2002 | Lin et al. | |
| 6,567,708 B1 | 5/2003 | Bechtel et al. | |
| 6,589,613 B1 | 7/2003 | Kunert | |
| 6,594,067 B2 | 7/2003 | Poll et al. | |
| 6,621,534 B2 | 9/2003 | Lin et al. | |
| 6,639,708 B2 | 10/2003 | Elkadi et al. | |
| 6,643,050 B2 | 11/2003 | Rukavina et al. | |
| 6,671,008 B1 | 12/2003 | Li et al. | |
| 6,671,080 B2 | 12/2003 | Poll et al. | |
| 6,795,226 B2 | 9/2004 | Agrawal et al. | |
| 6,819,467 B2 | 11/2004 | Lynam | |
| 6,829,074 B2 | 12/2004 | Terada et al. | |
| 6,829,511 B2 | 12/2004 | Bechtel et al. | |
| 6,842,276 B2 | 1/2005 | Poll et al. | |
| 6,950,221 B1 | 9/2005 | Terada et al. | |
| 7,002,720 B2 | 2/2006 | Beteille et al. | |
| 7,009,665 B2 | 3/2006 | Li et al. | |
| 7,023,600 B2 | 4/2006 | Mallya et al. | |
| 7,033,655 B2 | 4/2006 | Beteille et al. | |
| 7,081,929 B2 | 7/2006 | Furuki et al. | |
| 7,085,609 B2 | 8/2006 | Bechtel et al. | |
| 7,173,750 B2 | 2/2007 | Rukavina | |
| 7,230,748 B2 | 6/2007 | Giron et al. | |
| 7,300,166 B2 | 11/2007 | Agrawal et al. | |
| 7,423,664 B2 | 9/2008 | Ukawa | |
| 7,502,156 B2 | 3/2009 | Tonar et al. | |
| 7,505,188 B2 | 3/2009 | Niiyama et al. | |
| 7,525,714 B2 | 4/2009 | Poll et al. | |
| 7,542,809 B2 | 6/2009 | Bechtel et al. | |
| 7,671,948 B2 | 3/2010 | Ninomiya | |
| 7,719,751 B2 | 5/2010 | Egerton et al. | |
| 7,738,155 B2 | 6/2010 | Agrawal et al. | |
| 7,746,534 B2 | 6/2010 | Tonar et al. | |
| 7,817,327 B2 | 10/2010 | Derda | |
| 7,822,490 B2 | 10/2010 | Bechtel et al. | |
| 7,872,791 B2 | 1/2011 | Karmhag et al. | |
| 7,876,400 B2 | 1/2011 | Baliga et al. | |
| 7,906,203 B2 | 3/2011 | Hartig | |
| 7,960,854 B2 | 6/2011 | Paulus et al. | |
| 7,990,603 B2 | 8/2011 | Ash et al. | |
| 8,102,478 B2 | 1/2012 | Xue | |
| 8,164,818 B2 | 4/2012 | Collins et al. | |
| 8,169,587 B2 | 5/2012 | Bolton | |
| 8,187,682 B2 | 5/2012 | Albrecht et al. | |
| 8,189,254 B2 | 5/2012 | Voss et al. | |
| 8,199,264 B2 | 6/2012 | Veerasamy | |
| 8,213,074 B1 | 7/2012 | Shrivastava et al. | |
| 8,218,224 B2 | 7/2012 | Kwak et al. | |
| 8,219,217 B2 | 7/2012 | Bechtel et al. | |
| 8,263,228 B2 | 9/2012 | Torr | |
| 8,289,609 B2 | 10/2012 | Lamine et al. | |
| 8,343,571 B2 | 1/2013 | Werners et al. | |
| 8,355,112 B2 | 1/2013 | Bolton | |
| 8,482,838 B2 | 7/2013 | Sbar et al. | |
| 8,547,624 B2 | 10/2013 | Ash et al. | |
| 8,551,603 B2 | 10/2013 | Thompson | |
| 8,610,992 B2 | 12/2013 | Varaprasad et al. | |
| 8,619,204 B2 | 12/2013 | Saitoh et al. | |

(56) References Cited

U.S. PATENT DOCUMENTS

| | | | |
|---|---|---|---|
| 8,643,933 B2 | 2/2014 | Brown |
| 8,711,465 B2 | 4/2014 | Bhatnagar et al. |
| 8,810,889 B2 | 8/2014 | Brown |
| 8,869,493 B2 | 10/2014 | Chubb et al. |
| 8,913,215 B2 | 12/2014 | Yang et al. |
| 8,941,788 B2 | 1/2015 | Brecht et al. |
| 8,970,810 B2 | 3/2015 | Bowser et al. |
| 8,975,789 B2 | 3/2015 | Snyker et al. |
| 8,995,039 B2 | 3/2015 | Bartug et al. |
| 9,019,588 B2 | 4/2015 | Brown et al. |
| 9,036,242 B2 | 5/2015 | Bergh et al. |
| 9,091,868 B2 | 7/2015 | Bergh et al. |
| 9,097,842 B2 | 8/2015 | Van Nutt et al. |
| 9,102,124 B2 | 8/2015 | Collins et al. |
| 9,128,346 B2 | 9/2015 | Shrivastava et al. |
| 9,158,173 B2 | 10/2015 | Bhatnagar et al. |
| 9,176,357 B2 | 11/2015 | Lam et al. |
| 9,193,135 B2 | 11/2015 | Boote et al. |
| 9,316,883 B2 | 4/2016 | Sbar et al. |
| 9,333,728 B2 | 5/2016 | Veerasamy |
| 9,341,015 B2 | 5/2016 | Fernando et al. |
| 9,341,909 B2 | 5/2016 | Egerton et al. |
| 9,389,454 B2 | 7/2016 | Yamaguchi et al. |
| 9,400,411 B2 | 7/2016 | Poix et al. |
| 9,436,054 B2 | 9/2016 | Brown et al. |
| 9,436,055 B2 | 9/2016 | Shrivastava et al. |
| 9,442,341 B2 | 9/2016 | Shrivastava et al. |
| 9,477,130 B2 | 10/2016 | Dubrenat et al. |
| 9,494,717 B2 | 11/2016 | Reymond et al. |
| 9,550,457 B2 | 1/2017 | Green et al. |
| 9,568,799 B2 | 2/2017 | Lam et al. |
| 9,581,877 B2 | 2/2017 | Bass et al. |
| 9,606,411 B2 | 3/2017 | Bergh et al. |
| 9,606,412 B2 | 3/2017 | Geerlings et al. |
| 9,618,819 B2 | 4/2017 | Egerton et al. |
| 9,618,820 B2 | 4/2017 | Conklin et al. |
| 9,625,783 B2 | 4/2017 | Bjornard et al. |
| 9,664,976 B2 | 5/2017 | Rozbicki |
| 9,690,162 B2 | 6/2017 | Wilbur et al. |
| 9,726,925 B2 | 8/2017 | Relot et al. |
| 9,766,496 B2 | 9/2017 | Cammenga et al. |
| 9,810,963 B2 | 11/2017 | Gauthier et al. |
| 9,829,763 B2 | 11/2017 | Friedman et al. |
| 9,857,657 B2 | 1/2018 | Ash et al. |
| 9,891,454 B2 | 2/2018 | Zhang et al. |
| 9,927,609 B2 | 3/2018 | Cammenga et al. |
| 9,939,702 B2 | 4/2018 | Bjornard |
| 9,952,481 B2 | 4/2018 | Rozbicki et al. |
| 9,958,750 B2 | 5/2018 | Parker et al. |
| 9,958,751 B2 | 5/2018 | Bergh et al. |
| 9,963,383 B2 | 5/2018 | Veerasamy |
| 9,971,194 B2 | 5/2018 | Brecht et al. |
| 9,989,822 B2 | 6/2018 | Galstian |
| 2004/0233379 A1 | 11/2004 | Kinoshita et al. |
| 2005/0002081 A1 | 1/2005 | Beteille et al. |
| 2005/0132558 A1 | 6/2005 | Hennessy et al. |
| 2005/0233125 A1 | 10/2005 | Anderson et al. |
| 2008/0089073 A1 | 4/2008 | Hikmet |
| 2008/0317977 A1 | 12/2008 | Wu |
| 2009/0246426 A1 | 10/2009 | Wu |
| 2009/0279004 A1 | 11/2009 | Greenall et al. |
| 2009/0303565 A1 | 12/2009 | Karmhag et al. |
| 2010/0028585 A1 | 2/2010 | Shimatani |
| 2010/0279125 A1 | 11/2010 | Buyuktanir et al. |
| 2010/0315693 A1 | 12/2010 | Lam et al. |
| 2011/0007253 A1 | 1/2011 | Stocq |
| 2011/0181820 A1 | 7/2011 | Watanabe |
| 2012/0086904 A1 | 4/2012 | Oki et al. |
| 2012/0094118 A1 | 4/2012 | Oki et al. |
| 2012/0327499 A1 | 12/2012 | Parker et al. |
| 2013/0107563 A1 | 5/2013 | McCabe et al. |
| 2013/0265511 A1* | 10/2013 | Poix .................. B32B 17/10045 349/33 |
| 2013/0312341 A1* | 11/2013 | Gy .................. B32B 17/10788 156/101 |
| 2014/0020851 A1 | 1/2014 | Ouzts et al. |
| 2014/0204294 A1 | 7/2014 | Lv |
| 2014/0211129 A1 | 7/2014 | Bowser et al. |
| 2014/0247475 A1 | 9/2014 | Parker et al. |
| 2015/0049270 A1 | 2/2015 | Zhang et al. |
| 2015/0049378 A1 | 2/2015 | Shrivastava et al. |
| 2015/0103389 A1 | 4/2015 | Klawuhn et al. |
| 2015/0116649 A1 | 4/2015 | Watanabe |
| 2015/0118869 A1 | 4/2015 | Brown et al. |
| 2015/0151613 A1 | 6/2015 | Weng |
| 2015/0219975 A1 | 8/2015 | Phillips et al. |
| 2015/0277165 A1* | 10/2015 | Burrows .................. G02F 1/137 349/16 |
| 2015/0338713 A1 | 11/2015 | Brown |
| 2015/0346575 A1 | 12/2015 | Bhatnagar et al. |
| 2015/0370140 A1 | 12/2015 | Bertolini |
| 2015/0378189 A1 | 12/2015 | Kim et al. |
| 2016/0026061 A1 | 1/2016 | O'Keeffe |
| 2016/0085129 A1 | 3/2016 | Cammenga et al. |
| 2016/0085131 A1 | 3/2016 | Lam et al. |
| 2016/0096344 A1 | 4/2016 | Kurihara |
| 2016/0124284 A1 | 5/2016 | O'Keeffe |
| 2016/0138328 A1 | 5/2016 | Behmke et al. |
| 2016/0154290 A1 | 6/2016 | Brown et al. |
| 2016/0161818 A1 | 6/2016 | Gregard et al. |
| 2016/0187753 A1 | 6/2016 | Sbar et al. |
| 2016/0243773 A1 | 8/2016 | Wang |
| 2016/0312523 A1 | 10/2016 | Miyasaka et al. |
| 2016/0363831 A1 | 12/2016 | Ash et al. |
| 2016/0377951 A1 | 12/2016 | Harris |
| 2017/0028686 A1 | 2/2017 | Wilson et al. |
| 2017/0122028 A1 | 5/2017 | Suzuka et al. |
| 2017/0139302 A1 | 5/2017 | Tonar |
| 2017/0152702 A1 | 6/2017 | Chang et al. |
| 2017/0218686 A1 | 8/2017 | Galstian |
| 2017/0219908 A1 | 8/2017 | Brown et al. |
| 2017/0328121 A1 | 11/2017 | Purdy et al. |
| 2017/0371218 A1 | 12/2017 | Kailasam et al. |
| 2018/0011383 A1 | 1/2018 | Higashihara et al. |
| 2018/0095337 A1 | 4/2018 | Rozbicki et al. |
| 2018/0101080 A1 | 4/2018 | Gauthier et al. |
| 2018/0224689 A1 | 8/2018 | DeMiglio et al. |
| 2018/0307111 A1 | 10/2018 | Le Houx et al. |
| 2019/0018277 A1 | 1/2019 | Berner et al. |
| 2019/0137796 A1 | 5/2019 | Bjergaard et al. |
| 2019/0227357 A1 | 7/2019 | Williams et al. |
| 2019/0270284 A1 | 9/2019 | Couillard et al. |
| 2019/0346710 A1 | 11/2019 | Schleder et al. |
| 2020/0056423 A1 | 2/2020 | Bjergaard et al. |
| 2020/0256121 A1 | 8/2020 | Peters et al. |

FOREIGN PATENT DOCUMENTS

| | | |
|---|---|---|
| CN | 203858432 U | 10/2014 |
| CN | 105044965 A | 11/2015 |
| CN | 105334656 A | 2/2016 |
| CN | 205176432 U | 4/2016 |
| CN | 104948080 B | 6/2016 |
| CN | 205297172 U | 6/2016 |
| CN | 205558664 U | 9/2016 |
| CN | 206035269 U | 3/2017 |
| CN | 206352460 U | 7/2017 |
| CN | 107288492 A | 10/2017 |
| CN | 107327250 A | 11/2017 |
| CN | 206737720 U | 12/2017 |
| CN | 206801372 U | 12/2017 |
| CN | 206848627 U | 1/2018 |
| CN | 207004397 U | 2/2018 |
| EP | 978620 A2 | 2/2000 |
| EP | 2093051 A1 | 8/2009 |
| EP | 2256545 A1 | 12/2010 |
| EP | 2860580 A1 | 4/2015 |
| GB | 2546987 A | 8/2017 |
| JP | S62071930 A | 4/1987 |
| JP | H01202713 A | 8/1989 |
| JP | 2004182484 A | 7/2004 |
| JP | 2017068196 A | 4/2017 |
| KR | 20130037600 A | 4/2013 |
| WO | 2005084378 A2 | 9/2005 |

(56) References Cited

FOREIGN PATENT DOCUMENTS

| | | |
|---|---|---|
| WO | 2008090438 A2 | 7/2008 |
| WO | 2010100807 A1 | 9/2010 |
| WO | 2012111715 A1 | 8/2012 |
| WO | 2014032023 A1 | 2/2014 |
| WO | 2015059029 A1 | 4/2015 |
| WO | 2015100419 A1 | 7/2015 |
| WO | 2015117736 A1 | 8/2015 |
| WO | 2016008375 A1 | 1/2016 |
| WO | 2016043164 A1 | 3/2016 |
| WO | 2017008881 A1 | 1/2017 |
| WO | 2017011268 A1 | 1/2017 |
| WO | 2017183692 A1 | 10/2017 |
| WO | 2018086400 A1 | 5/2018 |

OTHER PUBLICATIONS

International Patent Application No. PCT/US2018/059472, International Search Report and Written Opinion dated Feb. 12, 2019, 14 pages.

\* cited by examiner

PRIVACY GLAZING SYSTEM WITH DISCRETE ELECTRICAL DRIVER

CROSS-REFERENCE

This application is a divisional of U.S. patent application Ser. No. 16/182,433, filed on Nov. 6, 2018, which claims the benefit of U.S. Provisional Patent Application No. 62/582,113, filed Nov. 6, 2017. The entire contents of each of these applications are incorporated herein by reference.

TECHNICAL FIELD

This disclosure relates to glazing structures that include electrically controllable optically active material and, more particularly, to electrical driver arrangements for glazing structure systems.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

For systems that use electricity to control the transition between transparent and privacy states, an electrical driver is typically provided to control the electrical signal delivered to the privacy structure. The driver may condition the electrical signal delivered to the privacy structure to provide a controlled transition from one state to another state and/or to maintain the privacy structure in a stable optical state.

SUMMARY

In general, this disclosure is directed to privacy structures incorporating an electrically controllable optically active material that provides controllable privacy. The privacy structures can be implemented in the form of a window, door, skylight, interior partition, or yet other structure where controllable visible transmittance is desired. In any case, the privacy structure may be fabricated from multiple panes of transparent material that include an electrically controllable medium between the panes. Each pane of transparent material can carry an electrode layer, which may be implemented as a layer of electrically conductive and optically transparent material deposited over the pane. The optically active material may be controlled via an electrical driver communicatively coupled to the electrode layers. In operation, the driver can control the application and/or removal of electrical energy to the optically active material. For example, the driver can control the application and/or removal of electrical energy from the optically active material to cause the optically active material to transition from a scattering state in which visibility through the structure is inhibited to a transparent state in which visibility through the structure is comparatively clear.

In practice, the driver may need to be located in relatively close physical proximity to the privacy structure the driver is intended to control. In applications where the privacy structure is implemented as a door, window, or other building component, there is typically no established space for installing the driver. In accordance with examples of the present disclosure, however, devices, systems, and techniques are described for discretely positioning a driver relative to a privacy structure to be controlled.

In one example, a privacy glazing structure is described that includes a first pane of transparent material, a second pane of transparent material, and a spacer positioned between the first pane of transparent material and the second pane of transparent material to define a between-pane space. The spacer seals the between-pane space from gas exchange with a surrounding environment and holds the first pane of transparent material a separation distance from the second pane of transparent material. The example structure also includes a third pane of transparent material and an electrically controllable optically active material positioned between the second pane of transparent material and the third pane of transparent material. The electrically controllable optically active material is positioned between a first electrode layer and a second electrode layer, which may be deposited over the second pane of transparent material and the third pane of transparent material, respectively. The example states that the spacer includes a tubular body having opposed ends joined together by a key. The key has first and second ends that are inserted into the opposed ends of the tubular body. The key includes a driver electrically connected to the first electrode layer and the second electrode layer. The driver is configured to be electrically connected to a power source and condition power received from the power source to provide a drive signal to the first electrode layer and the second electrode layer for controlling the electrically controllable optically active material.

In another example, a privacy glazing structure is described that includes a first pane of transparent material, a second pane of transparent material, and a spacer positioned between the first pane of transparent material and the second pane of transparent material to define a between-pane space. The spacer seals the between-pane space from gas exchange with a surrounding environment and holds the first pane of transparent material a separation distance from the second pane of transparent material. The example specifies that the privacy glazing structure also includes a third pane of transparent material and an electrically controllable optically active material positioned between the second pane of transparent material and the third pane of transparent material. The electrically controllable optically active material is positioned between a first electrode layer and a second electrode layer, which may be deposited over the second pane of transparent material and the third pane of transparent material, respectively. The example structure also includes a grill structure visually dividing the privacy glazing structure into a plurality of individual lites, each lite being separated from each other lite by a grill bar. The example specifies that the grill structure contains a driver electrically connected to the first electrode layer and the second electrode layer. The driver is configured to be electrically connected to a power source and condition power received from the power source to provide a drive signal to the first electrode layer and the second electrode layer for controlling the electrically controllable optically active material.

In another example, a privacy glazing system is described that includes a privacy glazing structure and a wall-mounted gang box. The privacy glazing structure includes a first pane of transparent material, a second pane of transparent material, and a spacer positioned between the first pane of transparent material and the second pane of transparent material to define a between-pane space. The spacer seals the between-pane space from gas exchange with a surrounding environment and holds the first pane of transparent material a separation distance from the second pane of transparent material. The structure also includes a third pane of transparent material and an electrically controllable optically active material positioned between the second pane of transparent material and the third pane of transparent material. The electrically controllable optically active material is positioned between a first electrode layer and a second electrode layer, which may be deposited over the second pane of transparent material and the third pane of transparent material, respectively. The example states that the wall-mounted gang box is located outside of the privacy glazing structure and contains a driver electrically connected to the first electrode layer and the second electrode layer via wiring extending from the wall-mounted gang box to the privacy glazing structure through an opening in a sash surrounding the privacy glazing structure. The driver is further electrically connected to a power source via wiring connected to wall power entering the wall-mounted gang box. The driver is configured to condition power received from the power source to provide a drive signal to the first electrode layer and the second electrode layer for controlling the electrically controllable optically active material.

In another example, a privacy door is described that includes a first pane of transparent material, a second pane of transparent material, and an electrically controllable optically active material positioned between the first pane of transparent material and the second pane of transparent material. The electrically controllable optically active material is further positioned between a first electrode layer and a second electrode layer, which may be deposited over the first pane of transparent material and the second pane of transparent material, respectively. The example further specifies that the door includes an optically opaque panel positioned across an external surface of the privacy door and a driver positioned behind the optically opaque panel. The driver is electrically connected to the first electrode layer and the second electrode layer. The driver is further electrically connected to a power source and configured to condition power received from the power source to provide a drive signal to the first electrode layer and the second electrode layer for controlling the electrically controllable optically active material.

The details of one or more examples are set forth in the accompanying drawings and the description below. Other features, objects, and advantages will be apparent from the description and drawings, and from the claims.

DETAILED DESCRIPTION

Figure 1:
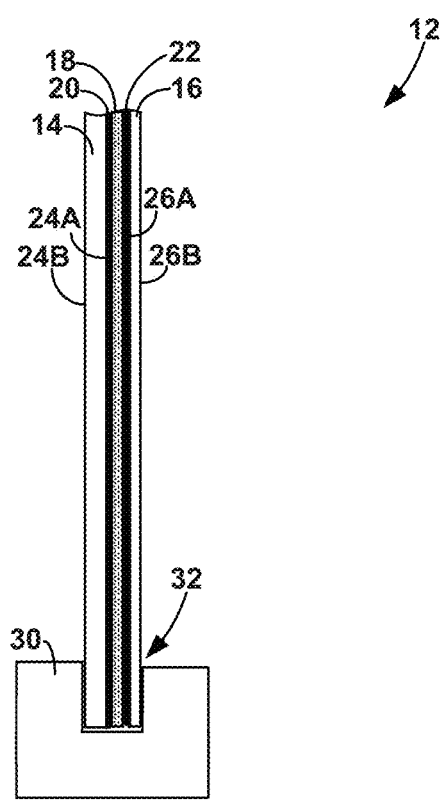
FIG. 1 is a side view illustration of an example privacy glazing structure configuration.

In general, the present disclosure is directed to electric driver arrangements for optical structures having electrically controllable light modulation. For example, an optical structure may include an electrically controllable optically active material that provides controlled transition between a privacy or scattering state and a visible or transmittance state. The electrical driver may receive power from a power source, such as a rechargeable and/or replaceable battery and/or wall or mains power source. The electrical driver can condition the electricity received from the power source, e.g., by changing the frequency, amplitude, waveform, and/or other characteristic of the electricity received from the power source. The electrical driver can deliver the conditioned electrical signal to electrodes that are electrically coupled to the optically active material. In addition, in response to a user input or other control information, the electrical driver may change the conditioned electrical signal delivered to the electrodes and/or cease delivering electricity to the electrodes. Accordingly, the electrical driver can control the electrical signal delivered to the optically active material, thereby controlling the material to maintain a specific optical state or to transition from one state (e.g., a transparent state or scattering state) to another state.

In the present disclosure, the term privacy structure includes privacy cells, privacy glazing structures, smart cells, smart glazing structure, and related devices that provide controllable optical activity and, hence, visibility through the structure. Such structures can provide switchable optical activity that provides controllable darkening, controllable light scattering, or both controllable darkening and controllable light scattering. Controllable darkening refers to the ability of the optically active material to transition between a high visible light transmission state (a bright state), a low visible light transmission dark state, and optionally intermediate states therebetween, and vice versa, by controlling an external energy source applied to the optically active material. Controllable light scattering refers to the ability of the optically active material to transition between a low visible haze state, a high visible haze state, and optionally intermediate states therebetween, and vice versa, by controlling an external energy source. Thus, reference to the terms "privacy" and "privacy state" in the present disclosure does not necessarily require complete visible obscuring through the structure (unless otherwise noted). Rather, different degrees of privacy or obscuring through the structure may be achieved depending, e.g., on the type of optically active material used and the conditions of the external energy source applied to the optically active material.

FIGS. 3-10 describe example electrical driver arrangements that may be used with a privacy structure. However, FIGS. 1 and 2 first describe example privacy structures that may utilize an electrical driver arrangement as described herein.

FIG. 1 is a side view of an example privacy glazing structure 12 that includes a first pane of transparent material 14 and a second pane of transparent material 16 with a layer of optically active material 18 bounded between the two panes of transparent material. The privacy glazing structure 12 also includes a first electrode layer 20 and a second electrode layer 22. The first electrode layer 20 is carried by the first pane of transparent material 14 while the second electrode layer 22 is carried by the second pane of transparent material. In operation, electricity supplied through the first and second electrode layers 20, 22 can control the optically active material 18 to control visibility through the privacy glazing structure.

As described in greater detail below, a driver can be electrically connected to the first electrode layer 20 and second electrode layer 22, e.g., via wiring or other electrically conductive member extending between the driver and respective electrode layer. In operation, the driver can condition power received from a power source for controlling the layer of optically active material 18, e.g., to maintain a specific optical state or to transition from one optical state to another optical state. The driver can have a variety of different arrangements and configurations relative to a privacy structure as described in greater detail herein.

Privacy glazing structure 12 can utilize any suitable privacy materials for the layer of optically active material 18. Further, although optically active material 18 is generally illustrated and described as being a single layer of material, it should be appreciated that a structure in accordance with the disclosure can have one or more layers of optically active material with the same or varying thicknesses. In general, optically active material 18 is configured to provide controllable and reversible optical obscuring and lightening. Optically active material 18 can be an electronically controllable optically active material that changes direct visible transmittance in response to changes in electrical energy applied to the material.

In one example, optically active material 18 is formed of an electrochromic material that changes opacity or color tinting and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 18 is formed of a liquid crystal material. Different types of liquid crystal materials that can be used as optically active material 18 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrode layers 20 and 22. When the electric field is off, the liquid crystals may be randomly oriented. This scatters light entering the liquid crystal and diffuses the transmitted light through the material. When a certain voltage is applied between the two electrode layers, the liquid crystals may homeotropically align and the liquid crystals increase in optical transparency, allowing light to transmit through the layer of liquid crystal material.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but light scattering upon application of an electric field.

In one example in which the layer of optically active material 18 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material 18, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 18 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 18 may contain spacer beads (e.g., micro-spheres), for example having an average diameter ranging from 3 micrometers to 40 micrometers, to maintain separation between the first pane of transparent material 14 and the second pane of transparent material 16.

In another example in which the layer of optically active material 18 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 18.

Another type of material that can be used as the layer of optically active material 18 is a suspended particle material. Suspended particle materials are typically dark or opaque in a non-activated state but become transparent when a voltage is applied. Other types of electrically controllable optically active materials can be utilized as optically active material 18, and the disclosure is not limited in this respect.

Independent of the specific type of material(s) used for the layer of optically active material 18, the material can change from a light transmissive state in which privacy glazing structure 12 is intended to be transparent to a privacy state in which visibility through the insulating glazing unit is intended to be reduced. Optically active material 18 may exhibit progressively decreasing direct visible transmittance when transitioning from a maximum light transmissive state to a maximum privacy state. Similarly, optically active material 18 may exhibit progressively increasing direct visible transmittance when transitioning from a maximum privacy state to a maximum transmissive state. The speed at which optically active material 18 transitions from a generally transparent transmission state to a generally opaque privacy state may be dictated by a variety factors, including the specific type of material selected for optically active material 18, the temperature of the material, the electrical voltage applied to the material, and the like.

Depending on the type of material used for optically active material 22, the material may exhibit controllable darkening. As noted above, controllable darkening refers to the ability of the optically active material to transition between a high visible light transmission state (a bright state), a low visible light transmission dark state, and optionally intermediate states therebetween, and vice versa, by controlling an external energy source applied to the optically active material. When optically active material 22 is so configured, the visible transmittance through the cell formed by flexible material 24, optically active material 22, and second pane of transparent material 16 may be greater than 40% when optically active material 22 is transitioned to the high visible transmission state light state, such as greater than 60%. By contrast, the visible transmittance through the cell may be less than 5 percent when optically active material 22 is transitioned to the low visible light transmission dark state, such as less than 1%. Visible transmittance can be measured according to ASTM D1003-13.

Additionally or alternatively, optically active material 22 may exhibit controllable light scattering. As noted above, controllable light scattering refers to the ability of the optically active material to transition between a low visible haze state, a high visible haze state, and optionally intermediate states therebetween, and vice versa, by controlling an external energy source. When optically active material 22 is so configured, the transmission haze through the cell formed by flexible material 24, optically active material 22, and second pane of transparent material 16 may be less than 10% when optically active material 22 is transitioned to the low visible haze state, such as less than 2%. By contrast, the transmission haze through the cell may be greater than 85% when optically active material 22 is transitioned to the high visible haze state and have a clarity value below 50%, such as a transmission haze greater than 95% and a clarity value below 30%. Transmission haze can be measured according to ASTM D1003-13. Clarity can be measured using a BYK Gardener Haze-Gard meter, commercially available from BYK-GARDNER GMBH.

To electrically control optically active material 18, privacy glazing structure 12 in the example of FIG. 1 includes first electrode layer 20 and second electrode layer 22. Each electrode layer may be in the form of an electrically conductive coating deposited on or over the surface of each respective pane facing the optically active material 18. For example, first pane of transparent material 14 may define an inner surface 24A and an outer surface 24B on an opposite side of the pane. Similarly, second pane of transparent material 16 may define an inner surface 26A and an outer surface 26B on an opposite side of the pane. First electrode layer 20 can be deposited over the inner surface 24A of the first pane, while second electrode layer 22 can be deposited over the inner surface 26A of the second pane. The first and second electrode layers 20, 22 can be deposited directed on the inner surface of a respective pane or one or more intermediate layers, such as a blocker layer, and be deposited between the inner surface of the pane and the electrode layer.

Each electrode layer 20, 22 may be an electrically conductive coating that is a transparent conductive oxide ("TCO") coating, such as aluminum-doped zinc oxide and/or tin-doped indium oxide. The transparent conductive oxide coatings can be electrically connected to a driver as described in greater detail below. In some examples, the transparent conductive coatings forming electrode layers 20, 22 define wall surfaces of a cavity between first pane of transparent material 14 and second pane of transparent material 16 which optically active material 18 contacts. In other examples, one or more other coatings may overlay the first and/or second electrode layers 20, 22, such as a dielectric overcoat (e.g., silicon oxynitride). In either case, first pane of transparent material 14 and second pane of transparent material 16, as well as any coatings on inner faces 24A, 26A of the panes can form a cavity or chamber containing optically active material 18.

The panes of transparent material forming privacy glazing structure 12, including first pane 14 and second pane of transparent material 16, and be formed of any suitable material. Each pane of transparent material may be formed from the same material, or at least one of the panes of transparent material may be formed of a material different than at least one other of the panes of transparent material. In some examples, at least one (and optionally all) the panes of privacy glazing structure 12 are formed of glass. In other examples, at least one (and optionally all) the privacy glazing structure 12 are formed of plastic such as, e.g., a fluorocarbon plastic, polypropylene, polyethylene, or polyester. When glass is used, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

In some examples, first pane 14 and/or second pane of transparent material 16 may be formed from multiple different types of materials. For example, the substrates may be formed of a laminated glass, which may include two panes of glass bonded together with a polymer such as polyvinyl butyral. Additional details on privacy glazing substrate arrangements that can be used in the present disclosure can be found in US Patent Publication No. 2018/0307111, titled "HIGH PERFORMANCE PRIVACY GLAZING STRUCTURES" and published on Oct. 25, 2018, the entire contents of which are incorporated herein by reference.

Privacy glazing structure 12 can be used in any desired application, including in a door, a window, a wall (e.g., wall partition), a skylight in a residential or commercial building, or in other applications. To help facilitate installation of privacy glazing structure 12, the structure may include a frame 30 surrounding the exterior perimeter of the structure (which also may be referred to as a sash). In different examples, frame 30 may be fabricated from wood, metal, or a plastic material such as vinyl. Frame 30 may define a channel 32 that receives and holds the external perimeter edge of structure 12. The sightline through privacy glazing structure 12 is generally established as the location where frame 30 ends and visibility through privacy glazing structure 12 begins.

Figure 2:
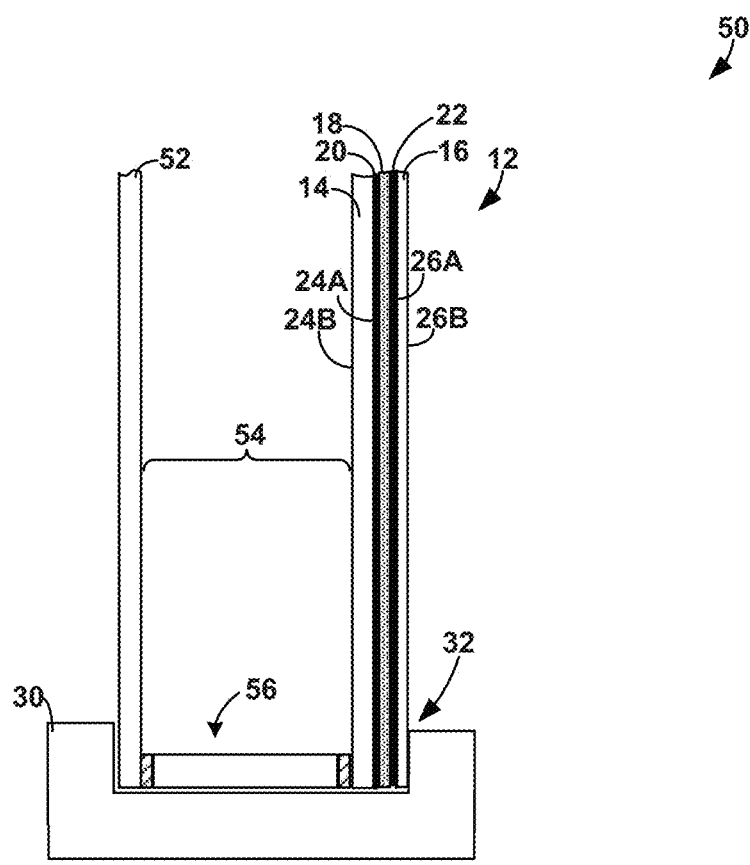
FIG. 2 is a side view illustration of another example privacy glazing structure configuration.

In the example of FIG. 1, privacy glazing structure 12 is illustrated as a privacy cell formed of two panes of transparent material bounding optically active material 18. In other configurations, privacy glazing structure 12 may be incorporated into a multi-pane glazing structure that include a privacy cell having one or more additional panes separated by one or more between-pane spaces. FIG. 2 is a side view of an example configuration in which privacy glazing structure 12 from FIG. 1 is incorporated into a multi-pane insulating glazing unit having a between-pane space.

As shown in the illustrated example of FIG. 2, a multi-pane privacy glazing structure 50 may include privacy glazing structure 12 separated from an additional (e.g., third) pane of transparent material 52 by a between-pane space 54 by a spacer 56. Spacer 56 may extend around the entire perimeter of multi-pane privacy glazing structure 50 to hermetically seal the between-pane space 54 from gas exchange with a surrounding environment. To minimize thermal exchange across multi-pane privacy glazing structure 50, between-pane space 54 can be filled with an insulative gas or even evacuated of gas. For example, between-pane space 54 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 54 may be evacuated so that the between-pane space is at vacuum pressure relative to the pressure of an environment surrounding multi-pane privacy glazing structure 50.

Spacer 56 can be any structure that holds opposed substrates in a spaced apart relationship over the service life of multi-pane privacy glazing structure 50 and seals between-pane space 54 between the opposed panes of material, e.g., so as to inhibit or eliminate gas exchange between the between-pane space and an environment surrounding the unit. One example of a spacer that can be used as spacer 56 is a tubular spacer positioned between first pane of transparent material 14 and third pane of transparent material 52. The tubular spacer may define a hollow lumen or tube which, in some examples, is filled with desiccant. The tubular spacer may have a first side surface adhered (by a first bead of sealant) to the outer surface 24B of first pane of transparent material 14 and a second side surface adhered (by a second bead of sealant) to third pane of transparent material 52. A top surface of the tubular spacer can be exposed to between-pane space 54 and, in some examples, includes openings that allow gas within the between-pane space to communicate with desiccating material inside of the spacer. Such a spacer can be fabricated from aluminum, stainless steel, a thermoplastic, or any other suitable material. Advantageous glazing spacers are available commercially from Allmetal, Inc. of Itasca, Ill., U.S.A.

Another example of a spacer that can be used as spacer 56 is a spacer formed from a corrugated metal reinforcing sheet surrounded by a sealant composition. The corrugated metal reinforcing sheet may be a rigid structural component that holds first pane of transparent material 14 apart from third pane of transparent material 52. Such a spacer is often referred to in commercial settings as swiggle spacer. In yet another example, spacer 56 may be formed from a foam material surrounded on all sides except a side facing a between-pane space with a metal foil. Such a spacer is commercially available from Edgetech under the trade name Super Spacer®. As another example, spacer 56 may be a thermoplastic spacer (TPS) spacer formed by positioning a primary sealant (e.g., adhesive) between first pane of transparent material 14 and third pane of transparent material 52 followed, optionally, by a secondary sealant applied around the perimeter defined between the substrates and the primary sealant. Spacer 56 can have other configurations, as will be appreciated by those of ordinary skill in the art.

Depending on application, first pane of transparent material 14, second pane of transparent material 16, and/or third pane of transparent material 52 (when included) may be coated with one or more functional coatings to modify the performance of privacy structure. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. Advantageous low-emissivity coatings include the LoE-180™, LoE-272™, and LoE-366™ coatings available commercially from Cardinal CG Company of Spring Green, Wis., U.S.A. A photocatalytic coating, by contrast, may be a coating that includes a photocatalyst, such as titanium dioxide. In use, the photocatalyst may exhibit photoactivity that can help self-clean, or provide less maintenance for the panes. Advantageous photocatalytic coatings include the NEAT® coatings available from Cardinal CG Company.

Figure 3:
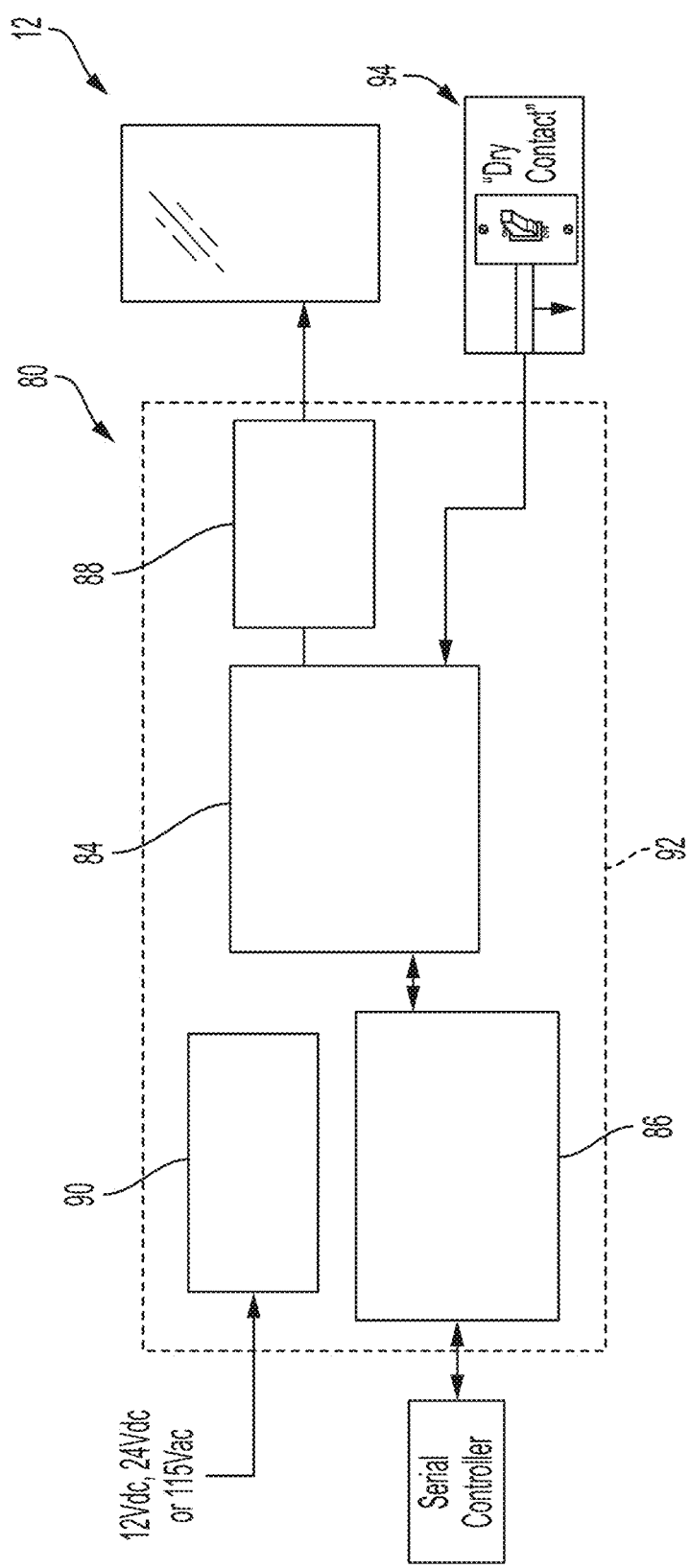
FIG. 3 is a block diagram of an example driver configuration that can be used to condition electricity supplied to an example privacy glazing structure according to FIGS. 1 and 2.

As briefly mentioned above, the panes of transparent material forming privacy glazing structure 12, whether implemented alone or in the form of multiple-pane structure with a between-pane space, can carry a first electrode layer 20 and second electrode layer 22 for controlling optically active material 18. The first electrode layer 20 and second electrode layer 22 can be electrically coupled to a driver that conditions power received from a power source to control optical active material 18. FIG. 3 is a block diagram of an example driver configuration that can be used to condition electricity supplied to privacy glazing structure 12.

As shown in the example of FIG. 3, a driver 80 can be electrically coupled to privacy glazing structure 12 via an electrical linkage 82. Driver 80 can include a controller 84, a communication module 86, an output circuit 88, and a power source 90. Some or all of the components of driver 80 may be contained in a housing 92. Controller 84 can communicate with the other components of driver 80 to manage the overall operation of the driver. In some examples, controller 84 may receive input from a user interface and/or sensor to control conditioning of the electrical signal received from power source 90. Controller 84 may include a processor and memory. The processor can run software stored in memory to perform functions attributed to controller 84. The memory can provide non-transitory storage of software used by and data used or generated by controller 84.

Communication module 86 can be implemented using a wired and/or wireless interface to communicate between controller 84 and the external environment. Communication module 86 may be used to send status information from driver 80 to an external computing device and/or to receive information concerning how driver 80 should be controlled. For example, driver 80 may be communicatively coupled via communication module 86 with a smart home computing system and/or a wireless module that would enable smart device control remotely. Example communication protocols that communication module 86 may communicate over include, but are not limited to, Ethernet (e.g., TCP/IP), RS232, RS485, and common bus protocols (e.g., CAN).

Output circuit 88, which may also be referred to as a driver circuit, can take control signals from controller 84 and power signals from power source 90 and generate a conditioned electrical signal supplied to privacy glazing structure 12. For example, the control signals received from controller 84 may dictate the frequency, amplitude, waveform, and/or other signal properties of the conditioned electrical signal to be supplied to privacy glazing structure 12 to control optically active material 18. Output circuit 88 can condition the power signal received from power source 90 using the control signal information received from controller 84. In some examples, output circuit 88 may generate feedback signals returned to controller 84 providing information for maintenance and/or status monitoring.

Power source 90 may be implemented using any source or combination of sources of electrical power to control privacy glazing structure 12. Power source 90 may be a battery source having a finite capacity and/or be a continuous source having an infinite capacity (e.g., wall or mains power, a direct current power source such as power over Ethernet (POE)). When configured with one or more batteries, the batteries may be rechargeable and/or replaceable. Examples of power source 90 include, but are not limited to, 115 Vac or 240 Vac, 12 Vdc, 24 Vdc, and combinations thereof. Power source 90 may or may not be located inside of driver housing 92, as illustrated in FIG. 3, depending on the manner in which the power source is implemented in the system.

To control driver 80, the privacy system may include a user interface 94. User interface 94 may be wired or wirelessly connected to controller 84. User interface 94 may include a switch, buttons, touch screen display, and/or other features with which a user can interact to control privacy glazing structure 12. In operation, a user may interact with user interface 94 to change the degree of privacy provided by privacy glazing structure 12. For example, the user may interact with user interface 94 to change privacy glazing structure 12 from a scattering or privacy state to a transparent or visible state, or vice versa, and/or the user may change to degree of privacy provided along a continuously variable spectrum. Information received from user interface 94 can be used by controller 84, e.g., with reference to information stored in memory, to control the electrical signal supplied to privacy glazing structure 12 by driver 80.

Figure 4:
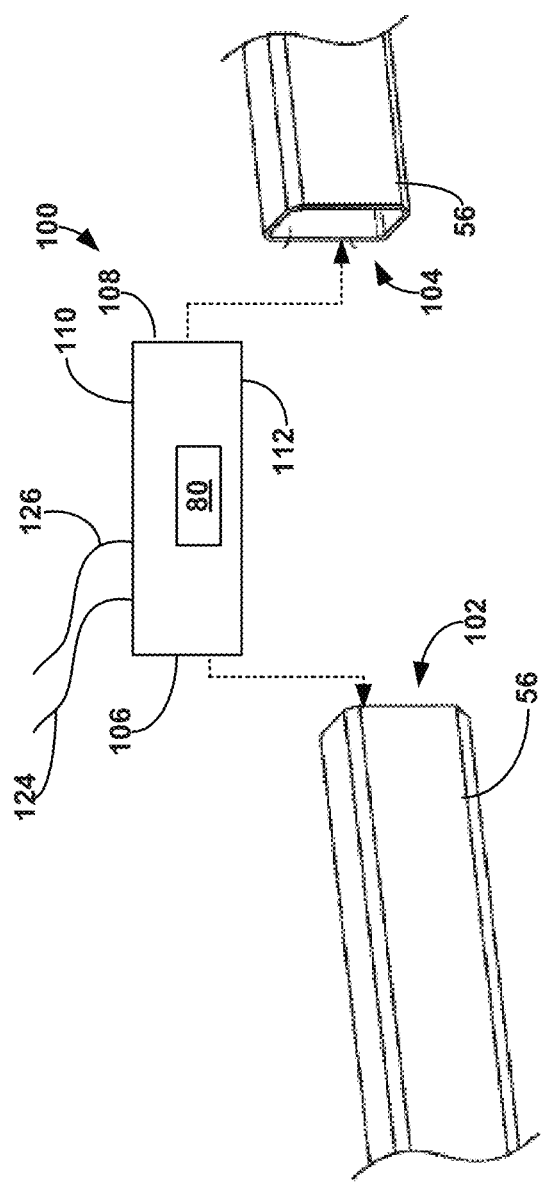
FIG. 4 is a schematic illustration of an example driver assembly that can be used with an example privacy glazing structure according to FIGS. 1 and 2 to discretely locate the driver relative to the glazing.

FIG. 4 is a schematic illustration of an example driver assembly that can be used with privacy glazing 12 to discretely locate the driver relative to the glazing. In particular, FIG. 4 illustrates driver 80 contained within a spacer key 100 joining opposed ends of spacer 56 together. As mentioned above in connection with FIG. 2, spacer 56 may surround the perimeter of glazing assembly 50 to define a hermetically sealed between-pane space. Spacer 56 may be formed of a single, unbroken, and/or unitary spacer member having two opposed ends 102 and 104 that join together at opposite ends of the single spacer member by spacer key 100. Alternatively, spacer 56 may include multiple spacer segments each joined together with spacer keys. In either case, spacer key 100 may be formed of a section of material of the same or different composition than spacer 56. Spacer key 100 is insertable into opposed ends 102 and 104 of the spacer to join the spacer together and form a closed structure extending around the perimeter of the glazing assembly. For example, spacer key 100 can have a cross-sectional size and/or substantially equivalent to spacer 56, e.g., with a first end 106 size and shape indexed to fit inside first end 102 of the spacer and a second end 108 size and shape indexed to fit inside second end 104 of the spacer.

Spacer 56 may define a hollow lumen or tube which, in some examples, is filled with desiccant (not illustrated). In some examples, the top surface of the tubular spacer includes openings that allow gas within between-pane space 54 (FIG. 2) to communicate into the lumen. When the tubular spacer is filled with desiccating material, gas communication between the between-pane space and desiccant in the lumen can help remove moisture from within the between-pane space, helping to prevent condensation between the panes.

For example, spacer 56 may be a rigid tubular structure that holds one pane of transparent material (e.g., 14) a fixed distance from another pane of material (e.g., 52) over the service life of unit. In different examples, spacer 56 is fabricated from aluminum, stainless steel, a thermoplastic, or any other suitable material. In some examples, spacer 56 defines a W-shaped cross-section (e.g., in the X-Z plane), but can define any polygonal (e.g., square, hexagonal) or arcuate (e.g., circular, elliptical) shape, or even combinations of polygonal and arcuate shapes.

Independent of the specific configuration of spacer 56, spacer key 100 can be a component that bridges the gap between the opposed ends 102, 104 of spacer 56, which may be ends of a single, unitary spacer body or ends of different individual spacer members. The ends 106, 108 of spacer key 100 may include projections, detents, or other mechanical engagement features to help keep the spacer key retained in spacer 56 once inserted. In some examples, spacer key 100 is formed of a polymeric material while spacer 56 is formed of metal, although other materials can be used.

In the example of FIG. 4, spacer key 100 contains driver 80. Spacer key 100 may form the driver housing 92 in which various components defining the driver are inserted and housed. Alternatively, driver 80 may include a separate driver housing 92 that is insertable into a space or cavity inside of spacer key 100. In some examples, spacer key 100 includes a close top surface 110 that faces between-pane space 54, when the spacer key and spacer are assembled to define the between-pane space. Spacer key 100 may include an opening in bottom surface 112 that provides access to an internal cavity of the spacer key. When so configured, driver 80 can be inserted into spacer key 100 through the opening in bottom surface of the key, e.g., before or after inserting the spacer key into opposed ends 102, 104 of spacer.

Figure 5A:
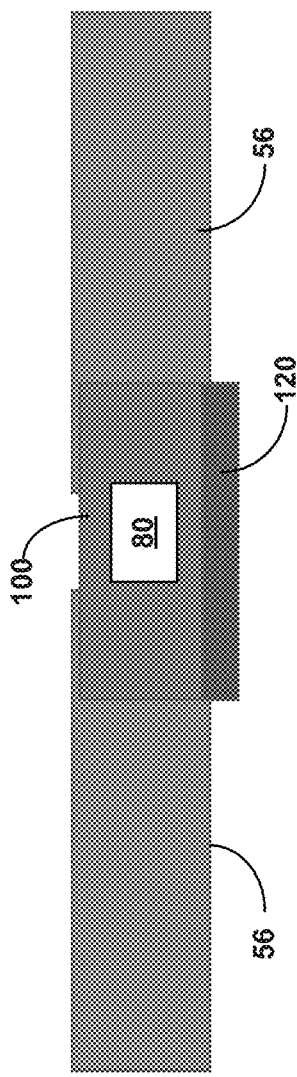
FIGS. 5A and 5B are side view illustrations showing example configurations of a spacer key containing a driver.
Figure 5B:
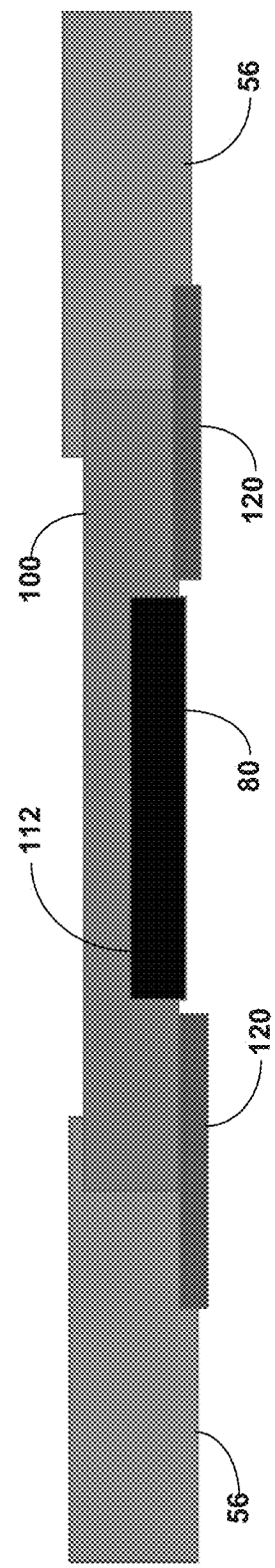

FIGS. 5A and 5B are side view illustrations showing example configurations of spacer key 100. In the example of FIG. 5A, driver 80 is contained within an interior cavity of spacer key 100. In the example of FIG. 5B, the bottom surface 112 of spacer key 100 is offset relative to the bottom surface of spacer 56, providing a spacer key gap region in which driver 80 can be inserted and attached to the spacer key. In either configuration, a sealant layer 120 may be positioned across the entire bottom surface of spacer key 100 and driver 80 contained therein, e.g., extending over the joints where the spacer key joins spacer 56 (FIG. 5A). Alternatively, sealant layer 120 may be positioned over the joints where the spacer key joins spacer 56 without extending across the entire bottom surface (FIG. 5B). The sealant layer 120 may be one or more polymeric and/or metal layers the inhibit gas diffusion. For example, sealant layer 120 may be a metal foil tape with adhesive backing to hold the metal foil to the surfaces of spacer 56 and spacer key 100.

In some examples, one or more polymeric sealant layers are positioned around spacer 56 and may or may not be positioned around spacer key 100 as well. For example, a two-part sealant system may be used that includes a primary sealant positioned in contact with spacer 56 and a secondary sealant overlaying the primary sealant. Example materials that may be used as the primary sealant include, but are not limited to, extrudable thermoplastic materials, butyl rubber sealants (e.g., polyisobutylene-based thermoplastics), polysulfide sealants, and polyurethane sealants. In some examples, the primary sealant is formed from a butyl rubber sealant that includes silicone functional groups or a polyurethane sealant that includes silicone functional groups. Example materials that may be used as the secondary sealant include acrylate polymers, silicone-based polymers, extrudable thermoplastic materials, butyl rubber sealants (e.g., polyisobutylene-based thermoplastics), polysulfide sealants, polyurethane sealants, and silicone-based sealants. For example, the secondary sealant may be a silicone-based sealant.

In some examples, electrical conductors 124, 126 extend from driver 80 (for example through a wall surface of spacer key 100) to electrically connect the driver to first electrode layer 20 and second electrode layer 22, respectively. If connected to a wall power source, an electrical conductor may extend from the power source to driver 80, e.g., through a wall surface of spacer key 100.

By configuring spacer key 100 with driver functionality, the driver may be positioned in close proximity to the electrodes of privacy glazing structure 12 to which the driver delivers a conditioned electrical signal. In addition, the driver may be discretely located in a visually unobtrusive space for the typical user. Moreover, by utilizing spacer key 100 as real estate for the driver, the driver may be readily installed by the manufacturer of privacy glazing structure, e.g., before shipping to a downstream fabricator that incorporates the structure in frame 30 or other desired end user package.

Figure 6:
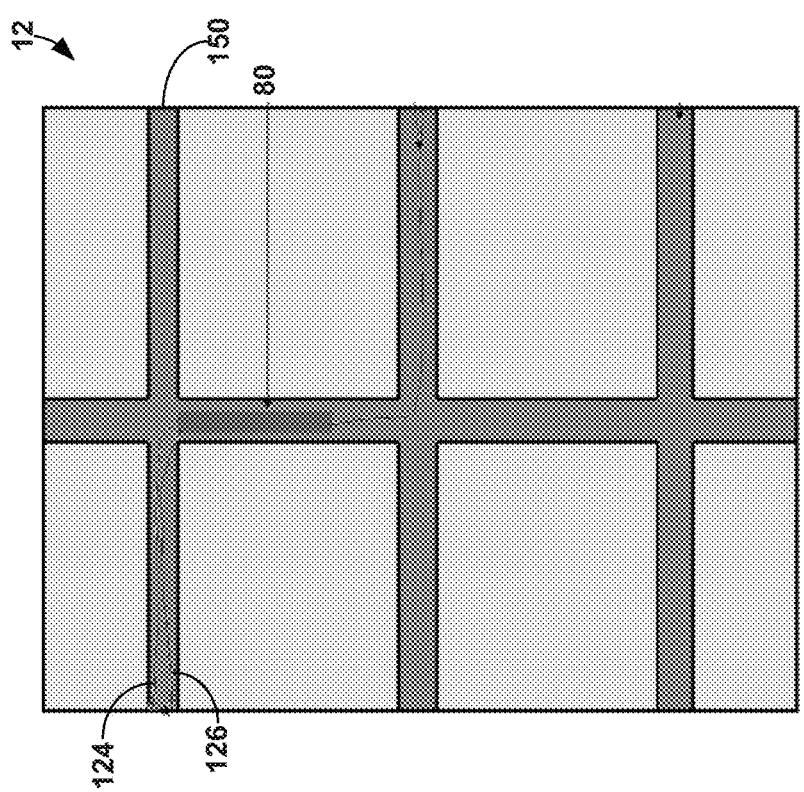
FIG. 6 is an illustration of another example driver assembly that can be used with an example privacy glazing structure according to FIGS. 1 and 2 to discretely locate the driver relative to the glazing.

FIG. 6 is an illustration of another example driver assembly that can be used with privacy glazing 12 to discretely locate the driver relative to the glazing. In particular, FIG. 6 illustrates a front face view of privacy glazing 12 showing the glazing with an example muntin bar or grill structure 150.

For aesthetic reasons, some privacy glazing structures such as windows or doors may include muntin bars. The muntin bars, which may also be called glazing bars or sash bars, divide a single window into a grid system of small panes of glass, called lites. Typical muntin bar patterns include grids of rectangles, squares, or diamonds. Muntin bars create the visual appearance that the window is formed of multiple, small pieces of glass joined together by the muntin bars instead of large, unitary panes of glass. This replicates the appearance of early windows and doors, which were formed of small panes of glass joined together instead of large unitary panes of glass, which were more expensive and difficult to manufacture. In different examples, the muntin bars can be located inside of a between-pane space 54 (in configurations where the assembly includes a between-pane space) or on a surface of privacy glazing structure accessible from an external environment (which may be an exterior environment exposed to natural elements or an interior environment of a building).

In different examples, muntin bars may be formed of a metal (e.g., aluminum, stainless steel), a polymer (e.g., vinyl), wood, or other material. Muntin bars can be of any size and can have any cross-sectional shape. For example, muntin bars can have any polygonal cross-sectional shape (e.g., square, rectangle), arcuate cross-sectional shape (e.g., circular, elliptical), or combinations of polygonal and arcuate shape. In some examples, muntin bars 150 have a contoured profile with a rectangular center that tapers toward the top and bottom of the stock along the height of the muntin bar. Depending on the style of muntin bar grid being fabricated, different muntin bar segments may be joined together, e.g., using notched joints such as half-lap joins, with or without the addition of joining keys.

Independent of the location of muntin bars 150, in the example of FIG. 6, driver 80 is contained within the muntin bar structure. One or more individual muntin bar segments forming a grid structure may define the driver housing 92 in which various components defining the driver are inserted and housed. Alternatively, driver 80 may include a separate driver housing 92 that is insertable into a space or cavity inside of one or more muntin bar segments. In either case, one or more of the muntin bars may include an opening defining a cavity in which driver 80 or components thereof can be placed in the muntin bar(s). The opening may be closed with a cover or seal, which may or may not be formed of the same material from which the muntin bars are fabricated, and may include any of the seal/seal layer materials discussed above. In some examples, the opening is on a face positioned in contact with the pane of transparent material against which muntin bars 150 are positioned. This may cause the opening, or any cover thereof, to be obscured when the muntin bars are positioned against the face of the pane of transparent material to visually divide the pane into a plurality of individual lites.

In some examples, electrical conductors 124, 126 extend from driver 80 to electrically connect the driver to first electrode layer 20 and second electrode layer 22, respectively. For example, the electrical conductors 124, 126 may extend through a hollow lumen formed through muntin bars 150 to an edge of privacy glazing structure 12 where electrical connections are made between the driver and electrode layers. If connected to a wall power source, an electrical conductor may extend from the power source to driver 80, e.g., through a lumen extending through muntin bars 150.

Figure 7:
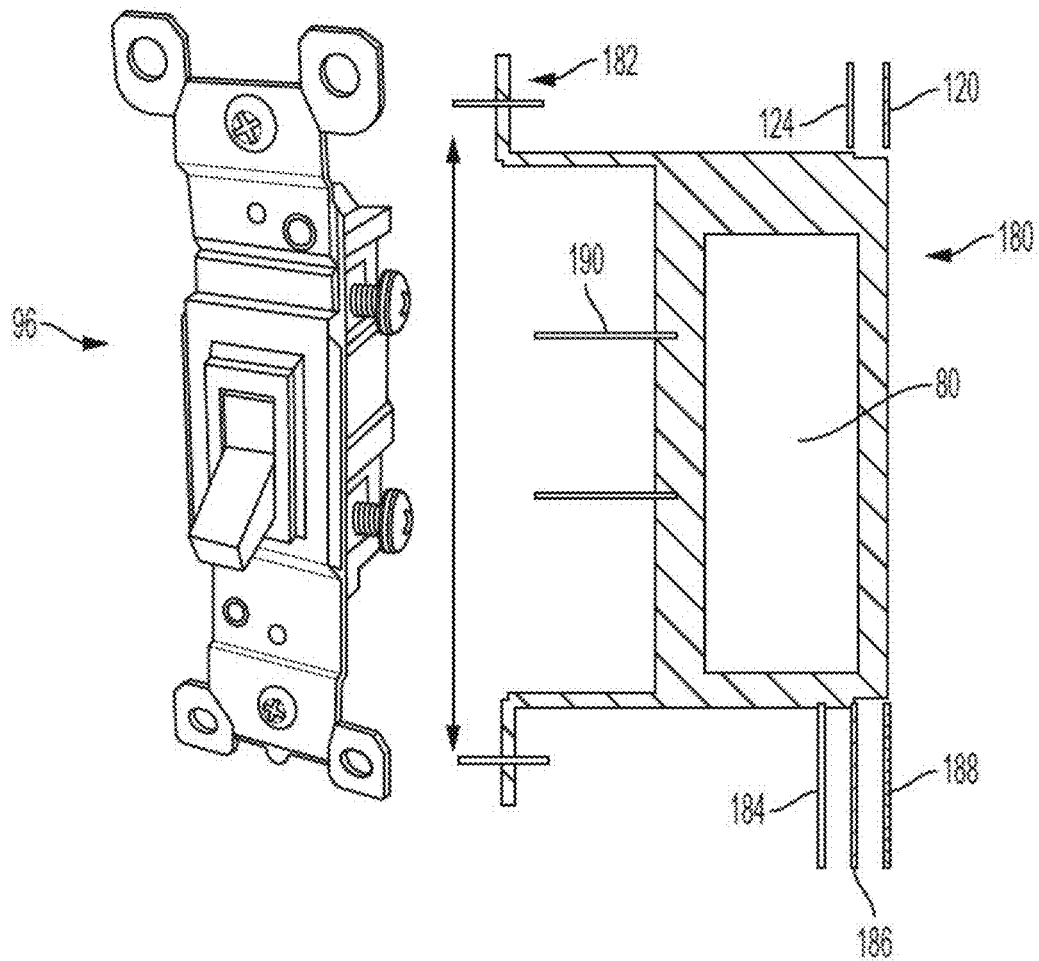
FIG. 7 is an illustration of another example driver assembly that can be used with an example privacy glazing structure according to FIGS. 1 and 2 to discretely locate the driver relative to the glazing.

FIG. 7 is an illustration of another example driver assembly that can be used with privacy glazing 12 to discretely locate the driver relative to the glazing. In the example of FIG. 7, driver 80 is installed within a wall-mounted gang box 180 configured to be located outside of and physically spaced from privacy glazing structure 12. Wall-mounted gang box 180 may be a box enclosed on five sides and open on a sixth, front side. Wall-mounted gang box 180 can be fabricated from metal or plastic and may or may not have integrated mechanical fasteners 182, such as securing apertures with pre-installed nails or screws, for securing the gang box to a wall stud of a building.

Figure 8B:
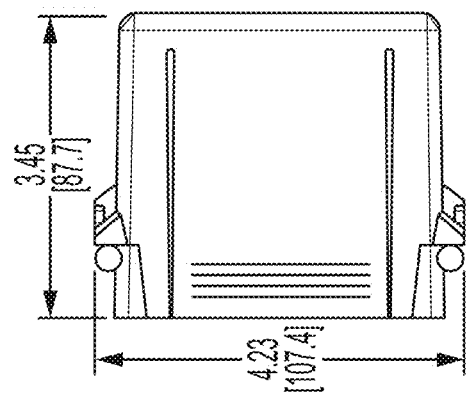
FIGS. 8A and 8B are illustrations of example single and double gang box structures, respectively, that may be used for mounting a driver to control a privacy glazing structure.
Figure 8B:
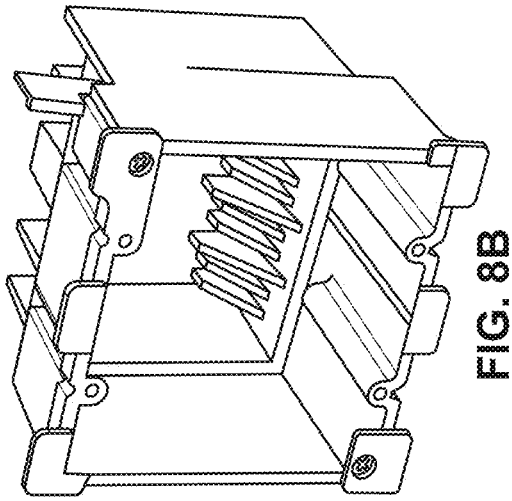
Figure 8A:
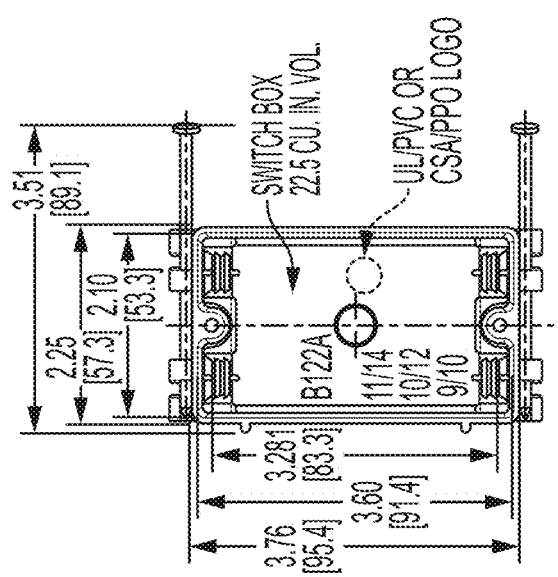
Figure 8A:
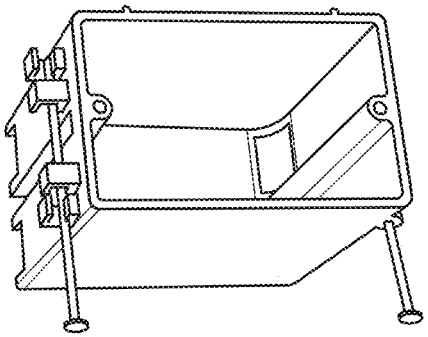

FIGS. 8A and 8B are illustrations of example single and double gang box structures, respectively, that may be used for mounting a driver to control privacy glazing structure 12 according to the disclosure. While dimensions of the gang box may vary, in some examples, gang box 180 has a height ranging from 3 inches to 4.5 inches (e.g., 3.75 inches), a width ranging from 1.75 inches to 2.75 inches (e.g., 2.25 inches), and a depth ranging from 2 inches to 4 inches, such as from 2.75 inches to 3.45 inches.

Gang box 180 may have power entering the gang box from a power source, which is illustrated as being implemented using three electrical conductors 184, 186, 188 (e.g., positive, negative, ground). The electrical conductors communicating with the power source can be electrically connected to driver 80 within gang box 180. In addition, electrical conductors 124, 126 may extend from driver 80 and gang box 180 to electrically connect the driver to first electrode layer 20 and second electrode layer 22, respectively. For example, the electrical conductors 124, 126 may extend from gang box 180, through a lumen passing through one or more studs forming a wall in which privacy glazing structure 12 is mounted, and/or through a frame or sash surrounding the privacy glazing structure to electrically connect with electrode layers 20, 22.

Figure 9:
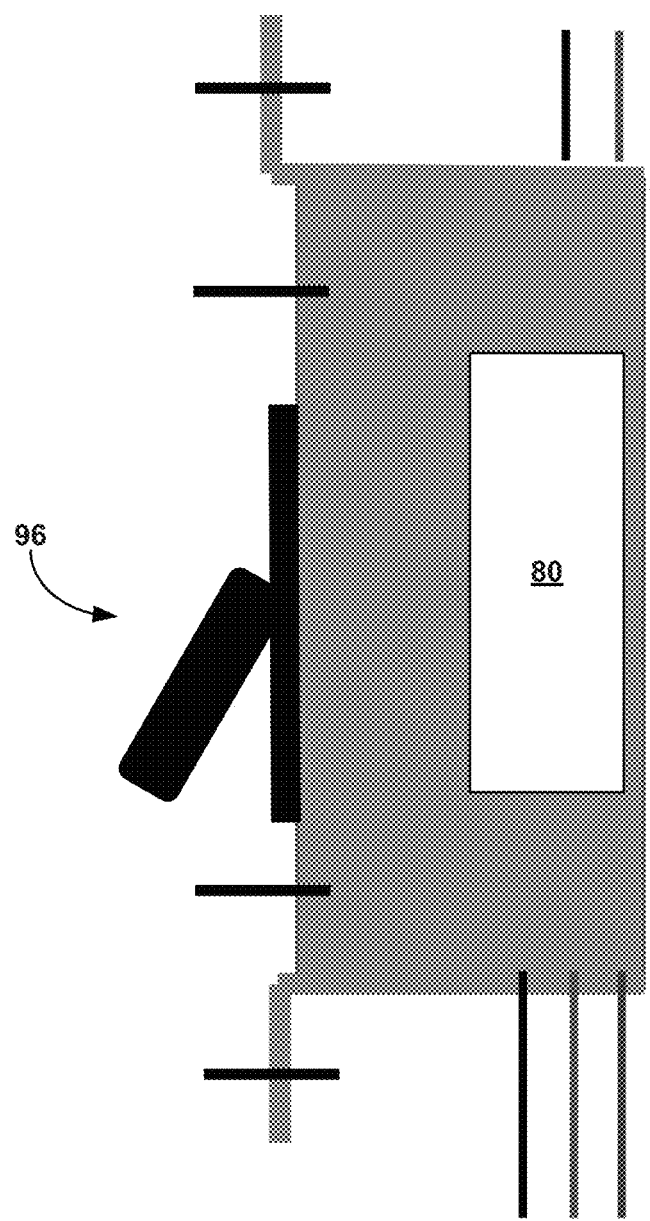
FIG. 9 is a side view illustration of an example integrated driver-gang-box assembly.

In some examples, driver 80 is mounted within gang box 180 and user interface 96 is also mounted in the gang box, e.g., over the driver. The user interface 96 can be connected to driver 80 in the gang box 180 and used to control conditioned electrical signals supplied by the driver to the privacy glazing structure. For example, driver 80 may have user interface contacts 190 on a front surface of the driver that are configured to connect to user interface 96, when the user interface is installed in the gang box. In different examples, user interface 96, which is illustrated as being a light or toggle-style switch, can be physically separate from and connectable to driver or can be integrated with the driver to form an integrated driver-gang-box assembly. For example, FIG. 9 is a side view illustration of an example integrated driver-gang-box assembly where user interface 94 is not separate from driver 80. Accordingly driver 80 need not be mounted in separate gang box but may be sized consistent with the size of a gang box for direct mounting to a stud. In addition, although user interface 96 is illustrated as a toggle or rocker switch, other types of user interfaces such as a capacitive touch switch, depressible buttons, slider, or the like may be used.

In some examples in which driver 80 is configured to be mounted in or as a gang box, the driver may have a height ranging from 50 mm to 100 mm (e.g., 60 mm), a width ranging from 15 mm to 55 mm (e.g., 35 mm), and a depth ranging from 15 mm to 60 mm (e.g., 25 mm). In practice, gang box 180 and the driver 80 contained therein may be mounted directly adjacent to privacy glazing 12 or may be mounted a distance away from the privacy glazing. For example, gang box 180 and the driver 80 may be mounted at least 1 foot away from a nearest perimeter edge of privacy glazing 12, such as at least 5 feet, or at least 10 feet. Alternatively, gang box 180 and driver 80 may be mounted within 1 foot from the nearest perimeter edge of the privacy glazing. In either case, electrical conductors 124, 126 may extend from driver 80 and gang box 180 to electrically connect the driver to first electrode layer 20 and second electrode layer 22, respectively.

Figure 10:
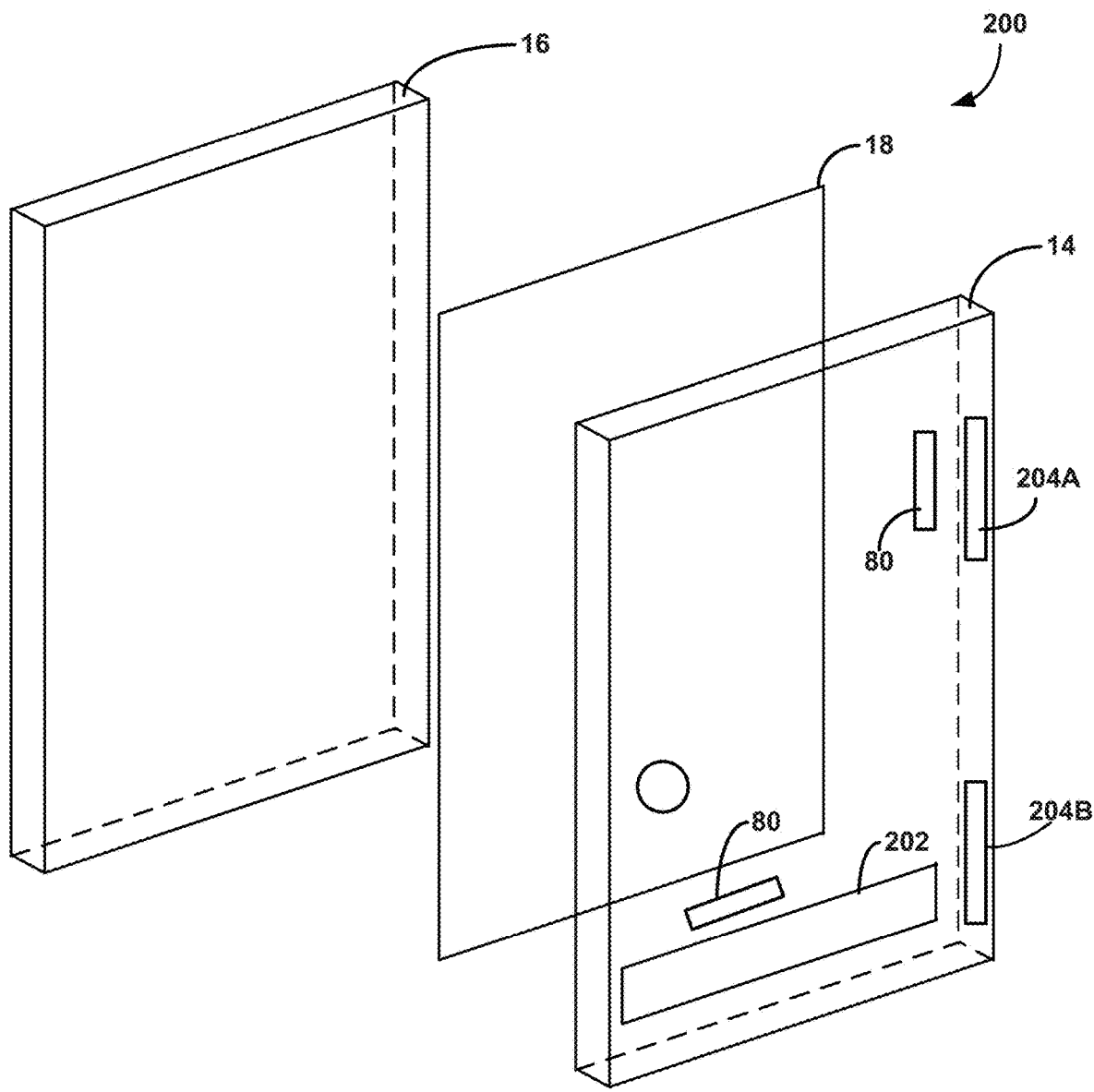
FIG. 10 is a perspective view of an example privacy door structure showing example driver mounting configurations.

FIG. 10 is an exploded perspective view of an example privacy door 200 showing an example driver assembly arrangement. Privacy door 200 can be constructed using the arrangement and configuration of components discussed above with respect to privacy glazing structure 12 (FIGS. 1 and 2). For example, privacy door 200 may include a first pane of transparent material 14, a second pane of transparent material 16, and an electrically controllable optically active material 18 positioned between the first and second panes of transparent material. The first pane of transparent material 14 can carry a first electrode layer, and the second pane of transparent material 16 can carry a second electrode layer, as discussed with respect to privacy glazing structure 12. Privacy door 200 may be visually transparent, or see through, when electrically controllable optically active material 18 is in a transparent state but optically obscured when the optically active material is in a darkened or privacy state.

To provide a location to discretely position driver 80 that is electrically coupled to the electrode layers carried by the panes of transparent material, privacy door 200 can include an optically opaque panel covering an access opening to an interior space formed within the door. For example, privacy door 200 in the example of FIG. 10 is illustrated as include a kick plate 202 positioned across the lower quadrant of the door. Privacy door 200 is also shown as having a hinge plate 204 which, in the illustrated example, is depicted as a top hinge plate 204A and bottom hinge plate 204B. The hinge plates can define mating surfaces where privacy door 200 is joined via hinge(s) to a door frame.

A cavity may be formed in first pane of transparent material 14 and/or privacy door 200 that is covered by and/or accessible through a corresponding optically opaque panel. Driver 80 can be within the cavity and electrically connected to the electrode layers carried by the transparent panels, e.g., using electrical conductors extending from the driver to each respective electrode layer. The cavity formed within privacy door 200 may form the driver housing 92 in which various components defining the driver are inserted and housed. Alternatively, driver 80 may include a separate driver housing 92 that is insertable into cavity. In either case, the optically opaque panel can be covered over the opening to discretely hide the driver within the opening. While FIG. 10 illustrates privacy door 200 with a driver positioned behind kick plate 202 and hinge plate 204A, in practice, such a door may utilize only a single driver.

The optically opaque plate may be fabricated from a material that is not visually transparent, regardless of the state of electrically controllable optically active material 18. For example, the optically opaque plate may be fabricated from non-transparent glass (e.g., frosted glass), metal, non-transparent plastic, or other suitable material.

The techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices.

If implemented in part by software, the techniques may be realized at least in part by a computer-readable data storage medium (e.g., a non-transitory computer-readable storage medium) comprising code with instructions that, when executed by one or more processors or controllers, performs one or more of the methods and functions described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various examples have been described. These and other examples are within the scope of the following claims.

The invention claimed is:

1. A privacy glazing structure comprising:
a first pane of transparent material;
a second pane of transparent material;
a spacer positioned between the first pane of transparent material and the second pane of transparent material to define a between-pane space, the spacer sealing the between-pane space from gas exchange with a surrounding environment and holding the first pane of transparent material a separation distance from the second pane of transparent material;
a third pane of transparent material;
an electrically controllable optically active material positioned between the second pane of transparent material and the third pane of transparent material, the electrically controllable optically active material being positioned between a first electrode layer and a second electrode layer and being configured to electrically control the electrically controllable optically active material; and
a grill structure visually dividing the privacy glazing structure into a plurality of individual lites, each lite being separated from each other lite by a grill bar,
wherein the grill structure contains a driver electrically connected to the first electrode layer and the second electrode layer, wherein the driver is configured to be electrically connected to a power source and condition power received from the power source to provide a drive signal to the first electrode layer and the second electrode layer for controlling the electrically controllable optically active material.

2. The structure of claim 1, wherein grill structure is located on an exterior surface of the first pane of transparent material.

3. The structure of claim 1, wherein the grill structure is located in the between-pane space.

4. The structure of claim 1, wherein the grill structure comprises a plurality of intersecting bars.

5. The structure of claim 1, wherein the grill structure defines at least one hollow bar defining a cavity in which the driver is positioned.

6. The structure of claim 5, wherein the hollow bar is closed on a surface facing the surrounding environment and defines an opening facing the first pane of transparent material.

7. The structure of claim 6, further comprising a seal placed over the opening.

8. The structure of claim 1, wherein the driver is configured to condition power received from the power source by altering at least one of a frequency, an amplitude, and a waveform of an electrical signal received from the power source.

9. The structure of claim 1, wherein the power source is wall power delivering alternating current.

10. The structure of claim 1, wherein the power source is a battery delivering direct current.

11. The structure of claim 1, wherein the driver comprises a controller that is configured to receive input from a user control located outside of the privacy glazing structure.

12. The structure of claim 1, wherein the second pane of transparent material and the third pane of transparent material are each laminate panes comprising a pair of glass substrates laminated together.

13. The structure of claim 1, wherein the first pane of transparent material and the second pane of transparent material are each fabricated from float glass.

14. The structure of claim 1, wherein:
the first electrode layer comprises a transparent conductive oxide coating deposited over the second pane of transparent material, and
the second electrode layer comprises a transparent conductive oxide coating deposited over the third pane of transparent material.

15. The structure of claim 1, further comprising wiring extending through the grill structure from the power source to the driver and further from the driver to the first and second electrode layers.

16. The structure of claim 1, wherein the electrically controllable optically active material is a liquid crystal material.

17. The structure of claim 16, wherein the liquid crystal material is monostable.

18. The structure of claim 1, wherein the electrically controllable optically active material is selected from the group consisting of an electrochromic material and a suspended particle material.

19. The structure of claim 1, wherein the privacy glazing structure is a window.

20. The structure of claim 1, wherein the grill structure is fabricated from wood and/or metal.

* * * * *